United States Patent
Moravek et al.

(10) Patent No.: US 10,134,289 B2
(45) Date of Patent: Nov. 20, 2018

(54) METHODS AND SYSTEMS FACILITATING STABILIZED DESCENT TO A DIVERSION AIRPORT

(71) Applicant: HONEYWELL INTERNATIONAL INC., Morris Plains, NJ (US)

(72) Inventors: Zdenek Moravek, Rozdrojovice (CZ); Robert Sosovicka, Brno (CZ); Filip Magula, Albrechtice (CZ); David Kunes, Tisnov (CZ); Katerina Sprinarova, Hradec Kralove (CZ); Ivan Lacko, Cana (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/047,355

(22) Filed: Feb. 18, 2016

(65) Prior Publication Data
US 2017/0243495 A1    Aug. 24, 2017

(51) Int. Cl.
*G06F 19/00* (2018.01)
*G06G 7/70* (2006.01)
(Continued)

(52) U.S. Cl.
CPC .............. *G08G 5/0021* (2013.01); *B64C 9/38* (2013.01); *G05D 1/0676* (2013.01);
(Continued)

(58) Field of Classification Search
CPC ...... G08G 5/0021; G08G 5/0039; B64C 9/38; G05D 1/0676
(Continued)

(56) References Cited

U.S. PATENT DOCUMENTS 3,690,598 A * 9/1972 Buchholz ............... G05D 1/063
                                                    244/182
5,398,186 A    3/1995 Nakhla
(Continued)

FOREIGN PATENT DOCUMENTS

EP    2317488 A2    5/2011
EP    2355071 A1    8/2011
(Continued)

OTHER PUBLICATIONS

FlightGear Forum; Using a Canvas Map in the GUI; 2012.
(Continued)

*Primary Examiner* — Harry Y Oh
(74) *Attorney, Agent, or Firm* — Lorenz & Kopf, LLP

(57) ABSTRACT

Methods and systems are provided for guiding or otherwise assisting operation of a vehicle to intersect a stabilized approach to a destination. One exemplary method of assisting an aircraft for landing at an airport involves obtaining, from a system onboard the aircraft, a current position of the aircraft and a current velocity of the aircraft, determining a descent strategy for the aircraft from the current position to an initialization point for a stable approach to the airport based at least in part on the current position and the current velocity, and providing indication of the descent strategy on a display device. The descent strategy is determined based on one or more validation criteria associated with the initialization point so that one or more predicted values for one or more characteristics of the aircraft satisfy the one or more validation criteria at the initialization point.

20 Claims, 8 Drawing Sheets

(51) Int. Cl.
*G08G 5/00* (2006.01)
*B64C 9/38* (2006.01)
*G05D 1/06* (2006.01)
*G08G 5/02* (2006.01)

(52) U.S. Cl.
CPC ......... *G08G 5/0013* (2013.01); *G08G 5/0039* (2013.01); *G08G 5/0091* (2013.01); *G08G 5/025* (2013.01)

(58) Field of Classification Search
USPC .......................................................... 701/16
See application file for complete search history.

(56) References Cited

U.S. PATENT DOCUMENTS

| | | | |
|---|---|---|---|
| 5,842,142 | A | 11/1998 | Murray et al. |
| 6,199,008 | B1 | 3/2001 | Aratow et al. |
| 6,381,535 | B1 | 4/2002 | Durocher et al. |
| 6,542,796 | B1 | 4/2003 | Gibbs et al. |
| 7,342,514 | B1 | 3/2008 | Bailey et al. |
| 7,499,771 | B2 | 3/2009 | Caillaud |
| 7,796,055 | B2 | 9/2010 | Clark et al. |
| 7,908,078 | B2 | 3/2011 | He |
| 7,963,618 | B2 | 6/2011 | Stone et al. |
| 7,996,121 | B2 | 8/2011 | Ferro et al. |
| 8,010,242 | B1 | 8/2011 | Ginsberg et al. |
| 8,026,831 | B2 | 9/2011 | Muramatsu et al. |
| 8,112,186 | B2 | 2/2012 | Sylvester |
| 8,135,500 | B1 | 3/2012 | Robinson |
| 8,200,378 | B1 | 6/2012 | Chiew et al. |
| 8,214,136 | B2 | 7/2012 | Caillaud |
| 8,292,234 | B2 | 10/2012 | Shuster |
| 8,521,343 | B2 | 8/2013 | Spinelli |
| 8,554,457 | B2 | 10/2013 | White et al. |
| 8,565,944 | B1 | 10/2013 | Gershzohn |
| 8,612,070 | B2 | 12/2013 | Geoffroy et al. |
| 8,615,337 | B1 | 12/2013 | McCusker et al. |
| 8,666,649 | B2 | 3/2014 | Otto et al. |
| 8,676,481 | B2 | 3/2014 | Coulmeau et al. |
| 8,723,686 | B1 | 5/2014 | Murray et al. |
| 8,849,478 | B2 | 9/2014 | Coulmeau et al. |
| 9,047,769 | B2 | 6/2015 | Lafon et al. |
| 9,064,407 | B2 | 6/2015 | Otto et al. |
| 9,098,996 | B2 | 8/2015 | Barraci et al. |
| 9,310,222 | B1 | 4/2016 | Suiter et al. |
| 9,423,799 | B1* | 8/2016 | Wu ........................ G05D 1/042 |
| 9,567,099 | B2 | 2/2017 | Poux et al. |
| 9,640,079 | B1 | 5/2017 | Moravek et al. |
| 9,646,503 | B2 | 5/2017 | Kawalkar et al. |
| 2004/0030465 | A1 | 2/2004 | Conner et al. |
| 2005/0049762 | A1 | 3/2005 | Dwyer |
| 2006/0025901 | A1 | 2/2006 | Demortier et al. |
| 2007/0050098 | A1 | 3/2007 | Caillaud |
| 2007/0078591 | A1 | 4/2007 | Meunier et al. |
| 2007/0219678 | A1* | 9/2007 | Coulmeau ............ G01C 23/005 701/3 |
| 2007/0241936 | A1 | 10/2007 | Arthur et al. |
| 2007/0299598 | A1 | 12/2007 | Fetzmann et al. |
| 2008/0110005 | A1 | 1/2008 | Small et al. |
| 2008/0300737 | A1 | 12/2008 | Sacle et al. |
| 2009/0150012 | A1 | 6/2009 | Agam et al. |
| 2009/0171560 | A1 | 7/2009 | McFerran et al. |
| 2010/0036551 | A1* | 2/2010 | Lacaze .................. G01C 23/00 701/18 |
| 2010/0036552 | A1 | 2/2010 | Pepitone et al. |
| 2010/0161156 | A1 | 6/2010 | Coulmeau et al. |
| 2010/0194601 | A1 | 8/2010 | Servantie et al. |
| 2010/0198433 | A1 | 8/2010 | Fortier et al. |
| 2011/0106345 | A1* | 5/2011 | Takacs ................. G05D 1/0676 701/17 |
| 2011/0264312 | A1 | 10/2011 | Spinelli et al. |
| 2012/0218127 | A1 | 8/2012 | Kroen |
| 2012/0245836 | A1 | 9/2012 | White et al. |
| 2013/0001355 | A1 | 1/2013 | Cox et al. |
| 2013/0046422 | A1 | 2/2013 | Cabos |
| 2013/0090842 | A1 | 4/2013 | Stabile |
| 2013/0103297 | A1 | 4/2013 | Bilek et al. |
| 2013/0179011 | A1 | 7/2013 | Colby et al. |
| 2013/0179059 | A1 | 7/2013 | Otto et al. |
| 2013/0204470 | A1* | 8/2013 | Luckner ................ G08G 5/025 701/18 |
| 2013/0218374 | A1* | 8/2013 | Lacko .................. G08G 5/0021 701/16 |
| 2013/0271300 | A1 | 10/2013 | Pepitone et al. |
| 2013/0304349 | A1 | 11/2013 | Davidson |
| 2014/0278056 | A1 | 9/2014 | Williams et al. |
| 2014/0309821 | A1 | 10/2014 | Poux et al. |
| 2014/0343765 | A1 | 11/2014 | Suiter et al. |
| 2014/0350753 | A1 | 11/2014 | Depape et al. |
| 2014/0358415 | A1* | 12/2014 | McDonald ............ G05D 1/101 701/120 |
| 2015/0015421 | A1 | 1/2015 | Krijger et al. |
| 2015/0081197 | A1 | 3/2015 | Gaertner et al. |
| 2015/0120098 | A1 | 4/2015 | Catalfamo et al. |
| 2015/0142222 | A1 | 5/2015 | Choi et al. |
| 2015/0241295 | A1 | 8/2015 | Fuscone et al. |
| 2015/0279218 | A1 | 10/2015 | Irrgang et al. |
| 2015/0371544 | A1 | 12/2015 | Mere |
| 2016/0041561 | A1* | 2/2016 | Davies ................. G05D 1/0676 701/6 |
| 2016/0063867 | A1* | 3/2016 | Zammit ............... G08G 5/0039 701/18 |
| 2016/0085239 | A1* | 3/2016 | Boyer .................. G08G 5/0021 701/5 |
| 2016/0116917 | A1* | 4/2016 | Bataillon ............... G05D 1/101 701/16 |
| 2016/0229554 | A1 | 8/2016 | Kawalkar et al. |
| 2016/0236790 | A1* | 8/2016 | Knapp ................. B64C 11/001 |
| 2017/0154537 | A1 | 6/2017 | Moravek et al. |
| 2017/0168658 | A1 | 6/2017 | Lacko et al. |
| 2017/0229024 | A1 | 8/2017 | Moravek et al. |
| 2017/0320589 | A1 | 11/2017 | Moravek et al. |

FOREIGN PATENT DOCUMENTS

| | | | |
|---|---|---|---|
| EP | 1963888 | B1 | 1/2013 |
| EP | 2574965 | A2 | 4/2013 |
| EP | 2657922 | A2 | 10/2013 |
| EP | 2657923 | A2 | 10/2013 |
| EP | 2790168 | A2 | 10/2014 |
| EP | 2800082 | A2 | 11/2014 |
| EP | 2980774 | A1 | 2/2016 |
| GB | 1153847 | A | 5/1969 |
| WO | 01/57828 | A1 | 8/2001 |
| WO | 2007006310 | A2 | 1/2007 |
| WO | 2012145608 | A1 | 10/2012 |
| WO | 2013162524 | A1 | 10/2013 |

OTHER PUBLICATIONS

Automated Ceiling Reports ForeFlight; 2015.
IPad Pilot News; 10 tips to increase your runway awareness with ForeFlight; 2015.
Extended EP Search Report for Application No. 16197629.5-1803 dated Jul. 4, 2017.
Haaroon, K; FMC Alternate Airport and Diversion; The Airline Pilots Forum & Resource, 2012.
Atkins, E.M. et al.; Emergency Flight Planning Applied to Total Loss of Thrust; Journal of Aircraft vol. 43, No. 4, Jul.-Aug. 2006.
Moravek, Z. et al.; Methods and Systems Facilitating Holding for an Unavailable Destination; filed Feb. 9, 2016 and assigned U.S. Appl. No. 15/019,675.
Moravek, Z. et al.; Methods and Systems for Safe Landing at a Diversion Airport; filed Feb. 9, 2016 and assigned U.S. Appl. No. 15/019,650.
Moravek, Z. et al.; Methods and Systems for Presenting Diversion Destinations; filed Nov. 30, 2015 and assigned U.S. Appl. No. 14/953,635.
USPTO Notice of Allowance for U.S. Appl. No. 15/019,675 dated Jan. 26, 2017.

(56) References Cited

OTHER PUBLICATIONS

ForeFlight Mobile Product Page Nov. 19, 2015; Reference Notes Last accessed at http://foreflight.com/products/foreflight-mobile.
AVPlan EFB Plan Faster, Fly Sooner Nov. 19, 2015; Reference Notes Last accessed at http://www.avplan-efb.com/avplan.
AivlaSoft Electronic Flight Bag—Cockpit efficiency and situational awareness Nov. 19, 2015; Reference Notes Last accessed at http://www.aivlasoft.com/index.html.
Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.
Stackexchange aviation http://aviation.stackexchange.com/ Dec. 31, 2014; Reference Notes http://aviation.stackexchange.com/questions/2854/when-are-aircraft-required-to-dump-fuel-for-emergency-landings.
What to Consider Overweight Landing? aero quarterly Dec. 31, 2007; Reference Notes http://www.boeing.com/commercial/aeromagazine/articles/qtr_3_07/AERO_Q307_article3.pdf.
Partial EP Search Report for Application No. 17152945.6-1803 dated Jul. 7, 2017.
Partial EP Search Report for Application No. 17164877.7-1803 dated Sep. 26, 2017.
USPTO Notice of Allowance for U.S. Appl. No. 15/145,346 dated Sep. 27, 2017.
Moravek, Z. et al.; Methods and Systems for Conveying Destination Viability; filed May 3, 2016 and assigned U.S. Appl. No. 15/145,346.
Chmelarova et al; Methods and Systems for Presenting En Route Diversion Destinations; filed Sep. 7, 2016 and assigned U.S. Appl. No. 15/258,400.
Moravek, Z. et al.; Flight Plan Segmentation for En Route Diversion Destinations; filed Nov. 21, 2016 and assigned U.S. Appl. No. 15/357,086.
Extended EP Search Report for Application No. 17151896.2-1557 dated Nov. 7, 2017.
Extended EP Search Report for Application No. 17152071.1-1557 dated Jul. 3, 2017.
USPTO Office Action for U.S. Appl. No. 15/145,346 dated Jun. 14, 2017.
USPTO Office Action for U.S. Appl. No. 14/953,635 dated Jun. 19, 2017.
Extended EP Search Report for Application No. 17164877.7 dated Feb. 13, 2018.
USPTO Office Action for U.S. Appl. No. 15/258,400 dated Dec. 14, 2017.
USPTO Office Action for U.S. Appl. No. 14/953,635 dated Dec. 28, 2017.
Extended EP Search Report for Application No. 17152945.6-1803 / 3208787 dated Nov. 7, 2017.

* cited by examiner

METHODS AND SYSTEMS FACILITATING STABILIZED DESCENT TO A DIVERSION AIRPORT

TECHNICAL FIELD

The subject matter described herein relates generally to vehicle display systems, and more particularly, embodiments of the subject matter relate to aircraft systems capable of facilitating safe descent for landing in a manner that reduces a pilot's workload, particularly in the case of an emergency or other diversion.

BACKGROUND

Often, it is desirable to operate an aircraft in accordance with a stabilized approach when close to the airport (e.g., within a few miles and aligned with the runway) in order to land safely. The stabilized approach is generally defined in terms of a number of specific criteria, which may be set forth by a safety organization (e.g., the Flight Safety Foundation), a standards organization or other regulatory body, an airline, an aircraft manufacturer, or the like. Achieving a stabilized approach can be a challenging task, especially in certain circumstances such as adverse weather conditions, on-board malfunctions, low quality of air traffic control (ATC), bad crew cooperation, fatigue, visual illusions, inexperienced crew members, and the like.

Traditionally, flight crews relied on memorized manuals or acquired experience in performing approaches. If a stabilized approach is not performed, regulations may require the crew to commence a "go-around" procedure, however, in some instances, flight crews may disobey the regulations (e.g., to meet "on-time" metrics, minimize costs, or the like) or a flight crew in an unstabilized approach situation may believe that they will stabilize the aircraft in time for a safe landing. That said, unstabilized approaches have been shown to be a causal factor in a number of approach- and landing-related incidents. Furthermore, in situations where an aircraft needs to deviate from an original flight plan, such as an emergency situation, achieving a stabilized approach to a diversion destination can be even more difficult due to the unplanned nature of the descent. Moreover, the time-sensitive nature of the aircraft operation in an emergency situation can increase the stress on the pilot, which, in turn, increases the likelihood of pilot error. Accordingly, it is desirable to reduce the mental workload of the pilot and better facilitate safe descent for an aircraft, particularly in the event of a diversion from its original flight plan.

BRIEF SUMMARY

Methods and systems are provided for assisting a vehicle for arriving at a destination, such as, for example, an aircraft landing at an airport. One exemplary method involves obtaining, from a system onboard an aircraft, a current position of the aircraft and a current velocity of the aircraft and determining a descent strategy for the aircraft from the current position to an initialization point for a stable approach to the airport based at least in part on the current position, the current velocity, and one or more validation criteria associated with the initialization point. The descent strategy is determined so that it results in one or more predicted values for one or more characteristics of the aircraft satisfying the one or more validation criteria upon reaching the stable approach initialization point. The method continues by providing indication of the descent strategy on a display device.

An apparatus for a vehicle system is also provided. The system includes a display device having a map associated with a vehicle displayed thereon and a processing system coupled to the display device. The map includes a graphical representation of the vehicle, a graphical representation of a destination, and a graphical representation of a route from a current position of the vehicle to the destination. The processing system is configured to determine a current energy level associated with the vehicle, determine a strategy for navigating the vehicle from the current position to an initial point for a stable approach to the destination based at least in part on the current energy level, the current position, and one or more validation criteria associated with the initial point, and provide indication of the strategy on the map in association with the route.

Another embodiment of a method involves obtaining, from a navigation system onboard a vehicle, a current position of the vehicle, identifying a diversion destination for the vehicle, obtaining, from a data storage element, a model quantifying characteristics of the vehicle, and determining an approach to the diversion destination satisfying one or more stabilization criteria using the model. The approach includes an initialization point having one or more threshold criteria associated therewith. The method continues by determining a strategy for navigating the vehicle from the current position to the initialization point based at least in part on the current position and the one or more threshold criteria associated with the initialization point and providing indication of the strategy on a display device. The strategy is determined so that it results in a predicted value for a characteristic of the vehicle satisfying the one or more threshold criteria upon reaching the initialization point.

BRIEF DESCRIPTION OF THE DRAWINGS

Embodiments of the subject matter will hereinafter be described in conjunction with the following drawing figures, wherein like numerals denote like elements, and:

FIG. 9 depicts a table of exemplary symbologies that may be utilized in accordance with one or more embodiments of the exemplary descent guidance display process of FIG. 2 in conjunction with one or more of the displays depicted in FIGS. 4-8;

FIG. 10 depicts a table exemplary combinations of symbologies that may be utilized in accordance with one or more embodiments of the exemplary descent guidance display process of FIG. 2 in conjunction with one or more of the displays depicted in FIGS. 4-8.

DETAILED DESCRIPTION

Figure 1:
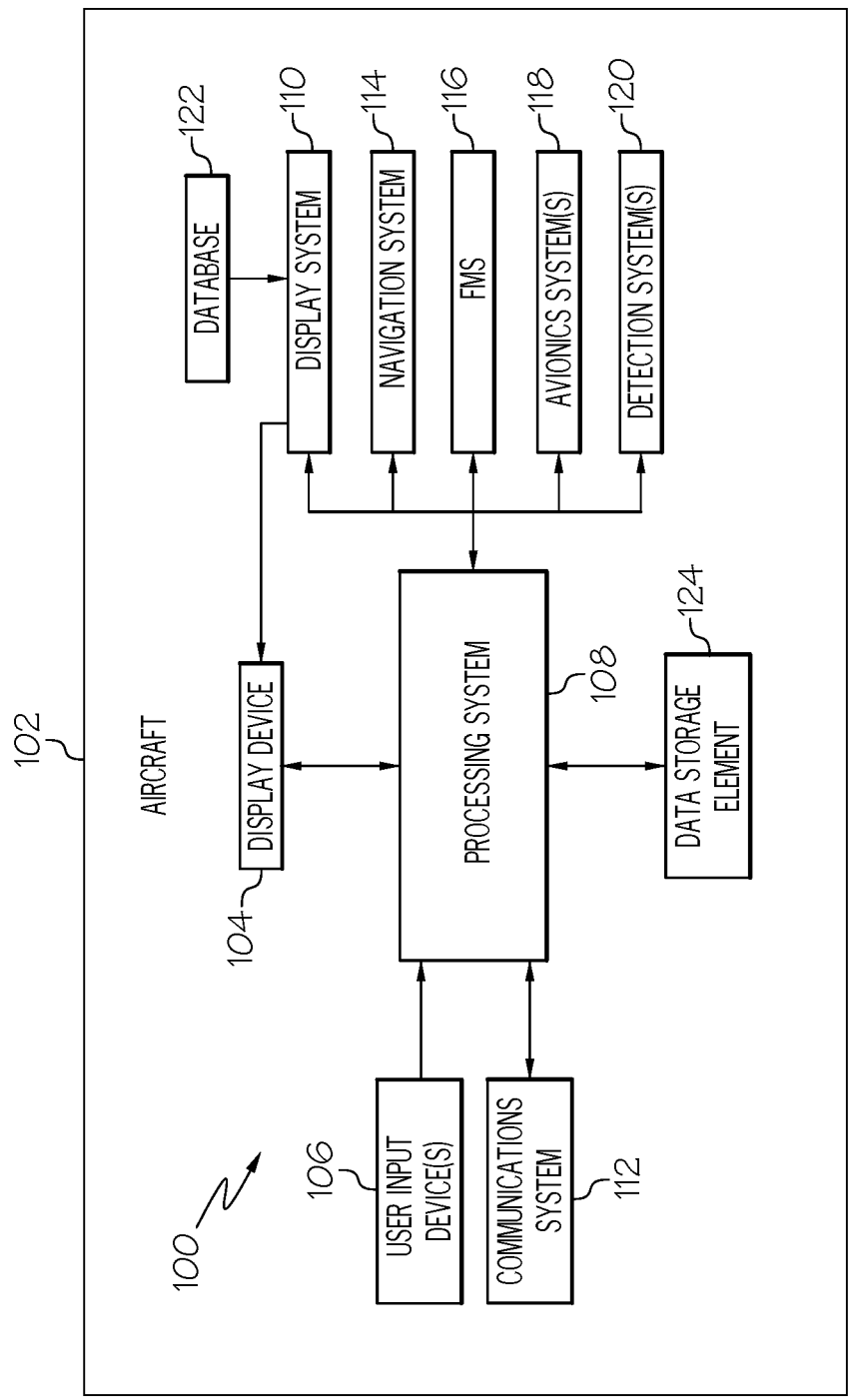
FIG. 1 is a block diagram of a system for an aircraft in an exemplary embodiment.

Embodiments of the subject matter described herein generally relate to systems and methods for facilitating a stable approach by a vehicle to a destination. As described in greater detail below, a stable approach is a navigational procedure that, when adhered to, ensures that the vehicle does not violate any applicable stabilization criteria (e.g., minimum and/or maximum travel rate limits, configuration or settings criteria for the vehicle, and the like) over a distance of travel proximate the destination. For in this regard, the stable approach may be determined using a model of the characteristics of the vehicle in conjunction with meteorological conditions and/or other factors that may influence the approach. As described in greater detail below, embodiments described herein determine a travel strategy for managing the energy level of the vehicle and intersecting the stable approach at an initial point of the approach (e.g., the end of the approach furthest from the destination) with an energy level that allows the vehicle to execute the stable approach without violating the stabilization criteria.

While the subject matter described herein could be utilized in various applications or in the context of various types of vehicles (e.g., automobiles, marine vessels, trains, or the like), exemplary embodiments are described herein in the context of determining a descent strategy for an aircraft that intersects a stable approach to an airport. For purposes of explanation, but without limitation, the subject matter is described herein in the context of presenting information pertaining to aircraft operations in the event of a diversion where the destination airport is not the originally intended or planned destination airport for a flight plan. Due to the unplanned and unpredictable nature of a diversion, identifying and executing a stable approach to a diversion airport as well as identifying and executing a stable descent that facilitates the stable approach is often complicated. For example, a pilot may be unable to determine whether or not a direct in-line descent along the route to the diversion airport will be too steep to achieve a stable approach, or what combination or sequence of aircraft configurations and descent rates will facilitate a stable approach.

Embodiments of the subject matter described herein determine and provide corresponding indication of a sequence of navigational segments and corresponding aircraft configuration settings and descent rates that make up a stable descent strategy aligned with the route to the diversion airport that reduces the energy level of the aircraft from its current energy level with respect to the airport (e.g., based on altitude, airspeed, aircraft weight and/or fuel remaining, wind speed and direction, and the like) to a predicted energy level at the initialization point of the stable approach that complies with any applicable validation criteria that define or otherwise limit the scenarios for which the stable approach is valid. At the same time, when the current energy level of the aircraft is such that the energy level of the aircraft is not capable of complying with the validation criteria for the stable approach if a direct in-line descent is flown regardless of the aircraft configuration settings deployed to increase drag or otherwise reduce the energy, the embodiments of the subject matter described herein determine and provide corresponding indication of one or more remedial actions that may be taken to reduce the energy level (e.g., a circling pattern at the current altitude with idle thrust and/or other aircraft configurations to increase drag and reduce airspeed) before executing a descent strategy capable of complying with the approach validation criteria at the initialization point of the approach.

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102, as described in greater detail below in the context of FIG. 11. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Figure 2:
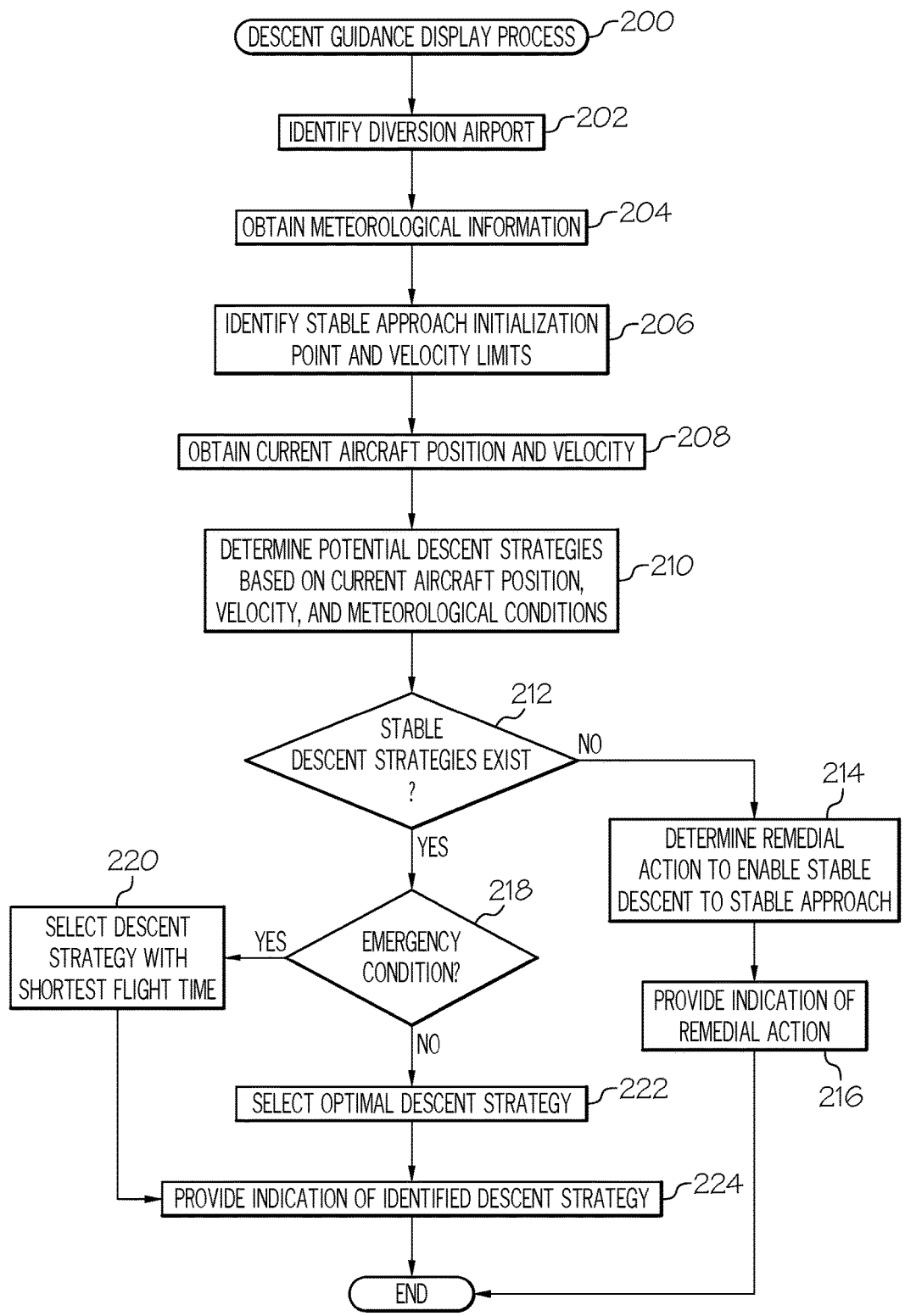
FIG. 2 is a flow diagram of an exemplary descent guidance display process suitable for use with the aircraft in the system of FIG. 1 in accordance with one or more embodiments.

Referring now to FIG. 2, in an exemplary embodiment, the system 100 is configured to support a descent guidance display process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the descent guidance display process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the descent guidance display process 200 may include any number of additional or alternative tasks, the tasks need not be performed in the illustrated order and/or the tasks may be performed concurrently, and/or the descent guidance display process 200 may be incorporated into a more comprehensive procedure or process having additional functionality not described in detail herein. Moreover, one or more of the tasks shown and described in the context of FIG. 2 could be omitted from a practical embodiment of the descent guidance display process 200 as long as the intended overall functionality remains intact.

Still referring to FIG. 2, and with continued reference to FIG. 1, in an exemplary embodiment, the descent guidance display process 200 begins by identifying or otherwise determining a diversion destination for the aircraft (task 202). In some embodiments, the processing system 108 receives indication of the desired diversion destination from a user via the user input device 106. In other embodiments, the processing system 108 may automatically select or otherwise identify the diversion destination from among a plurality of potential diversion destinations based on one or more factors, such as, for example, the current position of the aircraft 102 relative to the respective diversion destinations, the current fuel remaining onboard the aircraft 102 (or the current aircraft range), current meteorological conditions at the respective diversion destinations, current runway status at the respective diversion destinations, and the like. In this regard, the processing system 108 may automatically select a diversion airport that is likely to be most viable based on the current situation.

The descent guidance display process 200 continues by obtaining meteorological information for an aircraft operating region of interest (task 204). In this regard, the aircraft operating region of interest corresponds to a geographical area encompassing the current location of the aircraft 102 obtained via the navigation system 114 and the diversion airport. The processing system 108 obtains current or real-time meteorological information for points within the aircraft operating region from one or more of the onboard detection system(s) 120 and/or any external weather monitoring system(s) via the communications system 112. Additionally, the processing system 108 may obtain forecasted meteorological information for points within the aircraft operating region from one or more of the onboard detection system(s) 120 and/or any external weather monitoring system(s) for forecast time periods between the current time and the estimated time when the planned destination airport is expected to be available. It should be noted that the obtained meteorological information may be three-dimensional within the lateral geographic area encompassing the diversion destination and the current aircraft location to account for potential changes in the flight level or altitude of the aircraft 102 during execution of the diversion route.

In some embodiments, the processing system 108 also correlates or otherwise translates the meteorological information to navigational reference points. In this regard, the processing system 108 correlates or otherwise translates the meteorological information for points within the aircraft operating region to nearby navigational reference points within the aircraft operating region (e.g., waypoints, airways, and/or other navigational aids). Meteorological information corresponding to different locations within the aircraft operating region may be integrated, fused, extrapolated, interpolated, or otherwise combined to achieve likely meteorological information at or near the location associated with a particular navigational reference point that may be utilized for navigating the aircraft 102. Moreover, in some embodiments the meteorological information corresponding to different locations within the aircraft operating region may be integrated, fused, extrapolated, interpolated, or otherwise combined to achieve likely meteorological information for points along airways or points that otherwise intervene between navigational reference points or between the aircraft 102 and respective navigational reference points. Thus, meteorological data points may be essentially translated from a meteorological weather grid domain to a navigational reference point domain that can be utilized for navigating the aircraft 102.

In exemplary embodiments, after obtaining meteorological information for a region including the diversion destination, the descent guidance display process 200 continues by identifying or otherwise determining a point for initializing a stable approach to the diversion destination along with corresponding validation criteria associated with that point (task 206). In exemplary embodiments, the data storage element 124 stores or otherwise maintains a flight model quantifying or otherwise describing deceleration characteristics of the type of aircraft 102. The processing system 108 utilizes the model to calculate or otherwise determine a lateral distance required for the aircraft to decelerate and descend to the diversion airport in a stable manner based on the current and/or forecasted meteorological conditions at the diversion airport (e.g., headwinds, tailwinds, or the like), current and/or predicted aircraft weight at various stages of the approach, current and/or predicted aircraft configuration at various stages of the approach, the anticipated vertical profile or flight path to be flown during the approach, any current speed and/or altitude constraints from air-traffic control, and the like. Thus, the stabilized approach determined by the processing system 108 satisfies applicable stabilization criteria (e.g., minimum and/or maximum velocity or airspeed limits, a maximum descent rate limit, minimum and/or maximum power settings for the aircraft, and the like) while also achieving the proper aircraft configurations and alignment for landing upon reaching a decision point proximate the airport. In this regard, the final decision point may be the location on an approach where the aircraft 102 is at the decision height above ground level where an immediate go around must be initiated if the aircraft 102 is not stabilized and in the landing configuration at an appropriate landing speed, visual references are not visible to the pilot, or the like.

In one embodiment, the processing system 108 identifies or otherwise determines the approach procedure to be executed by the aircraft 102 for the diversion airport, and then calculates or otherwise determines the stabilized approach backwards from the decision point (e.g., the lateral position where the aircraft 102 is anticipated to be at the decision height based on the glideslope or other aspect of the procedure) towards a point where the aircraft 102 should initiate flap extension, alternatively referred to herein as the stable approach initialization point. In this regard, the stabilized approach may identify locations where the aircraft configuration should be changed (e.g., flap extension, landing gear extension, and the like) to facilitate landing and maintain compliance with stabilization criteria, along with corresponding descent rates and/or angles for the aircraft 102, and other guidance for flying a stable approach. In exemplary embodiments, the processing system 108 also calculates or otherwise determines validation criteria associated with the stable approach initialization point for which the stable approach is valid and capable of being executed by the aircraft 102. For example, the processing system 108 may calculate minimum and maximum potential airspeeds or velocities at the stable approach initialization point that will not require altering the power settings, aircraft configuration (e.g., speedbrake application), or other aspects of the aircraft 102 in a manner that would violate the stabilization criteria and render the approach unstable. In this regard, in some embodiments, the stabilization criteria may also include minimum and/or maximum airspeeds, which may further constrain the airspeed criteria associated with the stable approach initialization point. Thought the subject matter is described primarily herein in the context of velocity or airspeed criteria or the initialization point, in practice, additional validation criteria at the stable approach initialization point could include other criteria, such as, for example, minimum and/or maximum amounts of fuel remaining, a maximum aircraft weight, a particular aircraft configuration upon reaching the point, or the like.

Still referring to FIG. 2, after identifying a stable approach initialization point and velocity (or airspeed) limits associated therewith, the descent guidance display process 200 obtains the current aircraft position and velocity (or airspeed) and calculates or otherwise determines potential descent strategies for reaching the stable approach initialization point from the current aircraft position with a resulting velocity (or airspeed) that satisfies the limits associated with the stable approach initialization point (tasks 208, 210). In a similar manner as described above, the processing system 108 utilizes the flight model for the deceleration characteristics of the aircraft 102 to determine potential strategies for descending from the current location and altitude of the aircraft 102 to the location and altitude of the stable approach initialization point based on the current and/or forecasted meteorological conditions at the current location of the aircraft 102 and the navigational reference points (or region) between the current aircraft location and the stable approach initialization point, and additional factors described above (e.g., the current and/or predicted aircraft weight, the current and/or predicted aircraft configuration, and the like). For example, the processing system 108 may initially determine a current energy level of the aircraft 102 based on the current altitude (or above ground level) obtained from the navigation system 114, the current aircraft weight (which may be determined based at least in part on the current amount of fuel remaining), and the current velocity (or airspeed) of the aircraft 102. From there, the processing system 108 determines any potential combinations of descent rates and aircraft configurations that are capable of reducing the energy level of the aircraft 102 over the lateral distance along the route to the destination airport that result in a predicted energy level for the aircraft 102 at the stable approach initialization point that satisfies the validation criteria associated with the approach initialization point. For example, based on the current aircraft altitude and location, the current airspeed, and the current aircraft weight, the processing system 108 determines potential combinations of descent rates and aircraft configurations that result in the aircraft 102 having a predicted airspeed or velocity at the location and altitude associated with the stable approach initialization point that satisfies any airspeed or velocity limits associated with the stable approach initialization point.

For example, for one or more different airspeeds within the range of acceptable airspeeds at the approach initialization point, the processing system 108 calculates or otherwise determines one or more descent strategies backwards from the stable approach initialization point to the current aircraft position by varying the aircraft configuration, descent rate, and the like. Thus, each descent strategy corresponds to a sequence or combination of one or more descent segments, with each descent segment having a corresponding descent rate and aircraft configuration, which, in combination with the other descent segments of the particular descent strategy, results in the aircraft 102 having an airspeed at the stable approach initialization point that is greater than or equal to the minimum airspeed for starting the stabilized approach and less than or equal to the maximum airspeed for starting the stabilized approach. In other words, the processing system 108 determines a stable descent that conforms with the stabilized approach.

Still referring to FIG. 2, when the descent guidance display process 200 is unable to determine any stable descent strategies that conform with the stabilized approach, the descent guidance display process 200 identifies or otherwise determines one or more remedial actions that will enable flying the stabilized approach and provides indication of the remedial actions to the pilot (tasks 212, 214, 216). Thus, if the processing system 108 determines that the current energy level of the aircraft 102 (based on the current aircraft altitude, airspeed, weight, tailwinds, and the like) cannot be reduced over the distance between the current aircraft location and the stable approach initialization point to provide an airspeed that is less than the maximum airspeed threshold at the stable approach initialization point, the processing system 108 determines a manner in which the aircraft 102 can be operated to reduce the energy level before descending towards the diversion airport. For example, the processing system 108 may calculate or otherwise determine an amount of distance that the aircraft 102 should travel in a circling pattern to reduce the energy level of the aircraft 102 to a level for which a stable descent strategy to the stable approach initialization point can be determined. As described in greater detail below in the context of FIGS. 3 and 7-8, in exemplary embodiments, the processing system 108 generates or otherwise provides indication of the remedial action in concert with the stable descent strategy determined in conjunction with the remedial action.

In the illustrated embodiment, when the descent guidance display process 200 determines one or more stable descent strategies that conform with the stabilized approach, the descent guidance display process 200 identifies or otherwise determines whether an emergency condition exists and selects or otherwise identifies the descent strategy to be utilized based on the presence or absence of an emergency condition (tasks 218, 220, 222). In this regard, when the processing system 108 identifies an emergency condition (e.g., in response to pilot input via input device 106), the processing system 108 identifies or otherwise selects the descent strategy that has the shortest estimated flight time from among the potential descent strategies that conform with the stabilized approach. Conversely, in the absence of an emergency condition, the processing system 108 identifies or otherwise determines an optimal descent strategy based on one or more optimization criteria. In one or more embodiments, the processing system 108 may select a descent strategy by applying selection logic. For example, the processing system 108 may preferentially select a descent strategy that does not utilize modified aircraft configurations to increase drag (e.g., speedbrakes, early landing gear or flap extension, and the like), and if no such descent strategy exists or if the selection results in multiple descent strategies, the processing system 108 may select from among the remaining options based on other criteria (e.g., minimum flight time, minimum fuel consumption, lowest maximum descent rate, and/or the like). In other embodiments, the processing system 108 may calculate or otherwise determine a score associated with each potential descent strategy, and then select or otherwise identify an optimal descent strategy as the potential descent strategy based on the scoring (e.g., the descent strategy having the highest or lowest score). For example, for each potential descent strategy, the processing system 108 may calculate a respective descent score as a weighted combination of the estimated fuel consumption associated with the particular descent strategy, the estimated flight time (or arrival time) associated with the particular descent strategy, the descent rate(s) associated with the particular descent strategy (and the corresponding distance or duration for the respective descent rates), the aircraft configuration(s) associated with the particular descent strategy (and the corresponding distance or duration for the respective descent rates), and potentially other factors. In this regard, the weighting factors may be chosen to achieve a desired tradeoff between fuel consumption, arrival time, passenger comfort, and the like.

After identifying a descent strategy to be flown, the descent guidance display process 200 generates or otherwise provides indication of the descent strategy (task 222). In exemplary embodiments, the processing system 108 displays graphical indications of the descent rates, airspeeds, aircraft configurations, and other qualities that characterize the selected descent strategy on the display device 104 in conjunction with a graphical representation of the route (or at least a portion thereof) toward the diversion airport, for example, on a navigational map having a corresponding geographic area that encompasses the current aircraft position or a vertical profile (or vertical situation display) associated with the route to the diversion airport. In this regard, the processing system 108 may generate or otherwise provide indication of changes to the aircraft configuration at corresponding locations along the route by presenting symbology indicating particular aircraft configurations proximate corresponding navigational reference points or locations on the route where those configurations should occur, while numeric values for the targeted descent rates, airspeeds, altitudes, or the like may be similarly presented proximate their corresponding navigational reference points or locations along the route. Additionally, in some embodiments, the processing system 108 automatically updates a flight plan maintained by the FMS 116 to incorporate one or more aspects of the selected descent strategy, for example, by inserting the targeted descent rates, airspeeds and/or aircraft altitudes associated with one or more navigational reference points of the route defining the lateral flight path from the current aircraft position to the diversion destination.

In one or more exemplary embodiments, the descent guidance display process 200 dynamically updates the route in real-time in response to changes to the meteorological conditions, changes to the aircraft energy level from what was originally predicted (e.g., due to changes in the fuel consumption of the aircraft from what was originally predicted or jettisoning of fuel lowering the aircraft weight), or other factors. In this regard, as the aircraft travels and/or updated meteorological information becomes available, the descent guidance display process 200 may repeat to modify and update the descent strategy indicated to the pilot to ensure the stabilized approach can still be achieved from the stable approach initialization point. For example, if the wind direction changes or the magnitude of the winds changes by a relatively significant amount, the descent guidance display process 200 may update the displayed descent strategy to account for the change in winds (e.g., by indicating different aircraft configurations increasing/decreasing drag as needed).

It should also be noted that in some embodiments, the descent strategy and the stabilized approach may be iteratively determined to arrive at an optimal combination of a stable descent to a stabilized approach. For example, the processing system 108 may determine a plurality of different stabilized approach strategies, and select or otherwise identify an optimal stabilized approach strategy for an initial iteration of the descent guidance display process 200 (e.g., at task 206). If the processing system 108 is unable to identify a stable descent strategy that conforms with that initial stabilized approach strategy, or the identified descent strategy is suboptimal (e.g., it requires speedbrakes or some other undesirable aircraft configuration for descending), the processing system 108 may select or otherwise identify the next most optimal stabilized approach strategy for a subsequent iteration of the descent guidance display process 200, and so on, until the processing system 108 identifies a stable descent strategy that satisfies the desired criteria (e.g., no specialized aircraft configuration) and a stabilized approach that conforms with that descent strategy. In other embodiments, after the descent guidance display process 200 is completed and the processing system 108 identifies a stable descent strategy that conforms with that initial stabilized approach strategy, the processing system 108 may re-determine a plurality of different stabilized approach strategies that conform with the identified stable descent strategy, and then select or otherwise identify an optimal stabilized approach strategy for execution in conjunction with the identified descent strategy. Thus, in some embodiments, not only may the stable descent strategy be determined to conform with a stabilized approach, but the stabilized approach may also account for the descent strategy. In this regard, an optimal combination of a stabilized approach from a plurality of potential stabilized approach strategies and a descent strategy from a plurality of potential descent strategies may be identified to minimize pilot workload (e.g., selecting a combination that requires the fewest aircraft configuration changes), flight time, fuel consumption, passenger discomfort, or the like. For example, an initial descent strategy with the minimum flight time may be selected on an initial iteration of the descent guidance display process 200, then an updated stabilized approach conforming with that descent strategy and having a minimum flight time may be identified, and the descent guidance display process 200 may then repeat to determine if any other descent strategy confirming with the updated stabilized approach and having a shorter flight time than the initial descent strategy exists, and if so, select that descent strategy for re-determining an updated stabilized approach, and so on until a minimum cumulative flight time for a stabilized approach and stable descent is achieved.

Figure 3:
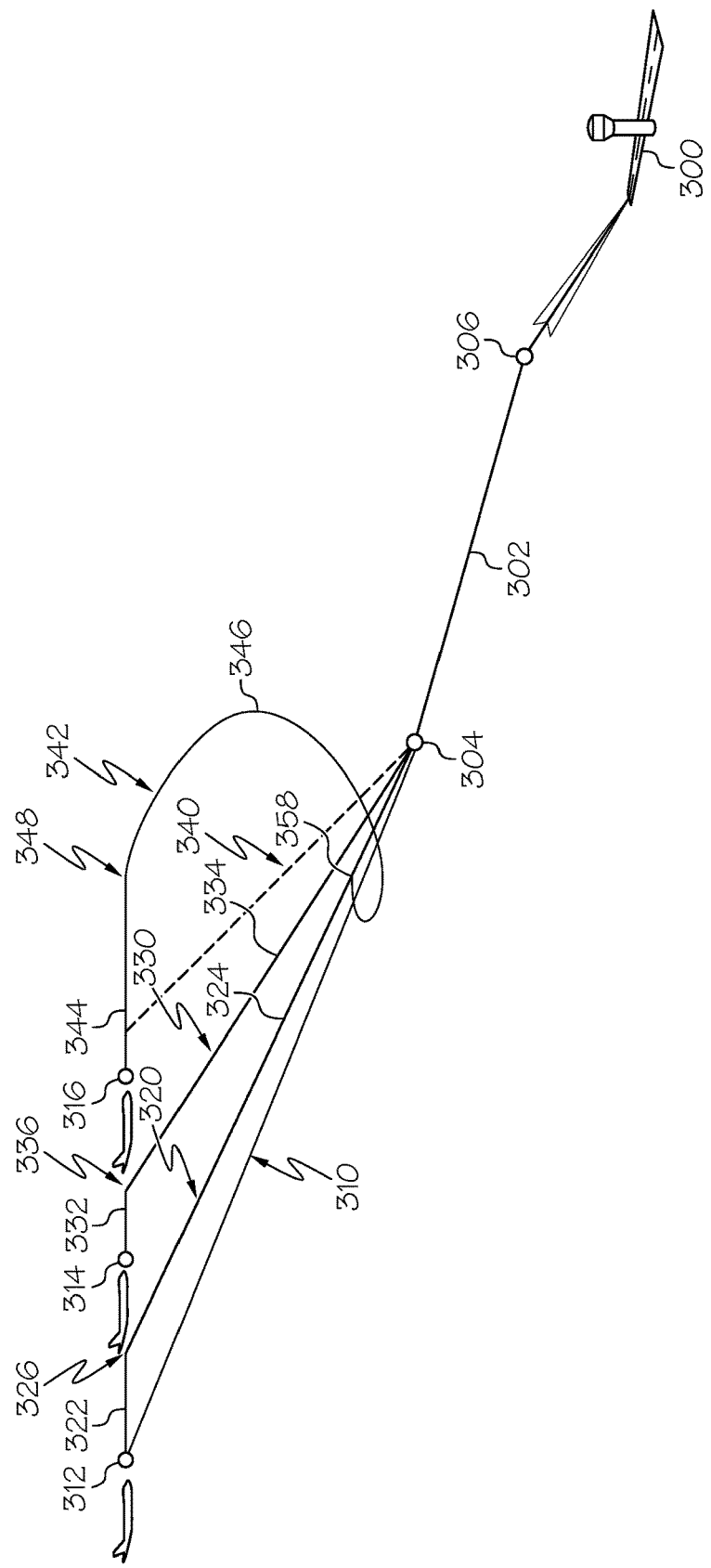
FIG. 3 depicts a vertical profile of exemplary descent strategies suitable for use with the descent guidance display process of FIG. 2 in accordance with one or more embodiments.

Referring now to FIG. 3, for a stabilized approach 302 from an initialization point 304 to a decision point 306 for a particular airport 300, a number of different descent strategies for reaching the initialization point 304 with an acceptable airspeed may exist depending on the current distance between the aircraft and the stabilized approach initialization point, the current airspeed of the aircraft, the current altitude of the aircraft relative to the stabilized approach initialization point, the current weight of the aircraft, the current and/or forecasted meteorological conditions, and potentially other factors. For example, from a first aircraft position 312, when the processing system 108 determines the current airspeed, altitude, aircraft weight, meteorological conditions, and the like allow for the aircraft 102 to reach the flap extension point 304 with an acceptable airspeed by using a constant descent rate and idle thrust along the route to the diversion airport 300, the processing system 108 may determine the corresponding descent rate for that descent strategy 310 and generate or otherwise provide indication of that descent rate on the display device 104.

Conversely, when the processing system 108 determines the current airspeed, altitude, aircraft weight, meteorological conditions, and the like require the aircraft 102 to reduce the current energy level before descending with a constant descent rate and idle thrust, the processing system 108 determines a different descent strategy 320 from the current aircraft position 312. In this example, the processing system 108 calculates or otherwise determines a distance for a first segment 322 of the descent strategy 320 for which the aircraft 102 should be flown at the current altitude with idle thrust to reduce the energy level, along with a distance and descent rate for a second segment 324 which allow for the aircraft 102 to reach the flap extension point 304 with an acceptable airspeed by using a constant descent rate and idle thrust along that segment 324 of the route to the diversion airport 300. In such an embodiment, the processing system 108 may generate or otherwise provide an indication of the transition point 326 at the calculated distance along the route from the current aircraft position at which the aircraft 102 should transition and begin descending along with an indication of the descent rate to be initiated upon reaching the transition point 326.

From another aircraft position 314, the processing system 108 may determine a descent strategy 330 that requires the aircraft 102 to reduce the current energy level before descending with a constant descent rate using an aircraft configuration to reduce energy level when the aircraft 102 cannot reach the approach initialization point 304 with an acceptable airspeed solely by idling thrust given the current distance between the aircraft 102 and the stabilized approach initialization point 304 (or airport 300), the current airspeed of the aircraft, the current aircraft altitude, the current aircraft weight, the current and/or forecasted meteorological conditions, and/or the like. In this example, the processing system 108 calculates or otherwise determines a distance for a first segment 332 of the descent strategy 330 for which the aircraft 102 should be flown at the current altitude with idle thrust to reduce the energy level, along with a distance and descent rate for a second segment 334 which allow for the aircraft 102 to reach the flap extension point 304 with an acceptable airspeed by using a constant descent rate and a configuration that reduces the energy level (e.g., applying speedbrakes) to reduce the energy level along that segment 334 of the route to the diversion airport 300. In such an embodiment, the processing system 108 may generate or otherwise provide an indication of the transition point 336 at the calculated distance along the route from the current aircraft position 314 at which the aircraft 102 should transition and begin descending along with an indication of the descent rate and aircraft configuration to be initiated upon reaching the transition point 336.

From another aircraft position 316, the processing system 108 may determine that the current energy level of the aircraft 102 prevents a stabilized approach by flying along the route to the airport 300. For example, the rate of descent for a theoretical descent strategy 340 aligned with the route to the airport 300 from the current aircraft position 316 may be too steep and result in an excessive airspeed upon reaching the approach initialization point 304. Accordingly, the processing system 108 determines a descent strategy 342 that indicates a remedial action that sufficiently reduces the energy level of the aircraft 102 before proceeding with a stable descent along the route to the airport 300. The illustrated descent strategy 342 includes an initial segment 344 to reduce the energy level at the current aircraft altitude before proceeding with a descending circling segment 346 that ultimately intersects with a stable descent strategy for reaching the approach initialization point 304 with an acceptable airspeed and an aircraft heading aligned with the route to the airport 300. For example, in the illustrated embodiment, the circling descent 346 intersects with a stable descent strategy 320 using idle thrust at a point 350 along descent segment 324 that is substantially vertically aligned with the transition point 348 where the circling descent 346 was initiated (i.e., at the same latitude and longitude but different altitude level). In such an embodiment, the processing system 108 may generate or otherwise provide an indication of the transition point 348 at the calculated distance along the route from the current aircraft position 316 at which the aircraft 102 should transition and begin the circling pattern 346 along with an indication of the descent rate and distance or radius associated with the circling pattern 346 and any aircraft configuration to be initiated upon reaching the transition point 348, along with an indication of the descent rate and any aircraft configuration to be initiated upon returning to the location of the initial transition point 348 at a different altitude level (i.e., transition point 350) for proceeding on a stable descent aligned with the route to the airport 300.

Figure 4:
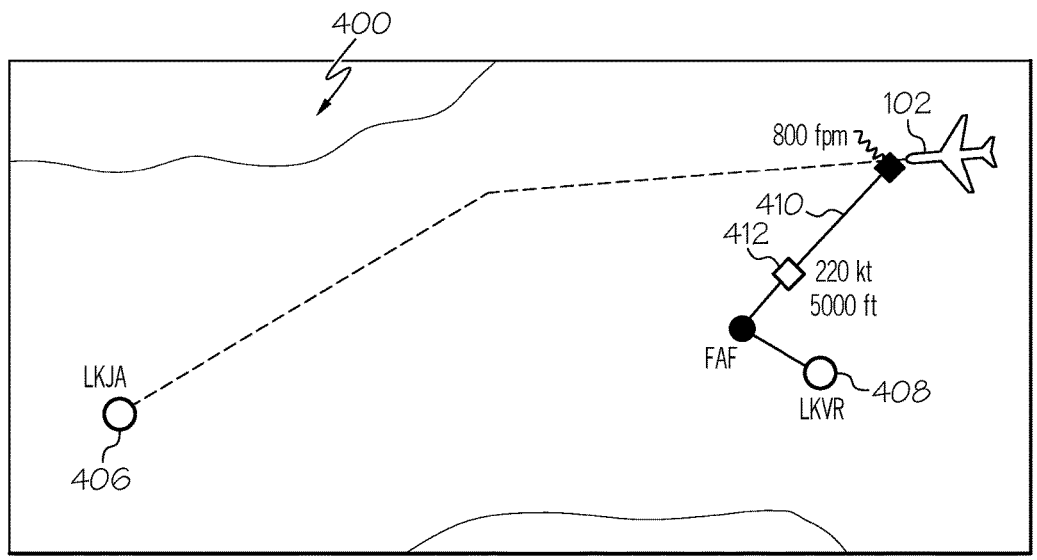
FIGS. 4-7 depict an exemplary navigational map displays suitable for display on a display device associated with the aircraft in the system of FIG. 1 in accordance with one or more embodiments of the exemplary descent guidance display process of FIG. 2.

FIG. 4 depicts an exemplary navigational map display 400 that may be displayed, rendered, or otherwise presented on the display device 104 in conjunction with the descent guidance display process 200 of FIG. 2. The display system 110 and/or processing system 108 displays and/or renders the navigational map 400 on the display device 104. The illustrated navigational map 400 includes a graphical representation 402 of the aircraft 102 overlaid or rendered on top of a background 404. The background 404 comprises a graphical representation of the terrain, topology, navigational reference points, airspace designations and/or restrictions, or other suitable items or points of interest corresponding to the currently displayed area of the navigational map 400, which may be maintained in a terrain database, a navigational database, a geopolitical database, or another suitable database. For example, the display system 110 may render a graphical representation of navigational aids (e.g., VORs, VORTACs, DMEs, and the like) and airports within the currently displayed geographic area of the navigational map 400 overlying the background 404. Some embodiments of navigational map 400 may also include graphical representations of airspace designations and/or airspace restrictions, cities, towns, roads, railroads, and other geo-political information. In addition, depending on the embodiment, the descent guidance display process 200 may render other real-time flight related information that is within the geographic area corresponding to the currently displayed area of the navigational map 400 or within a particular proximity of the aircraft, such as, for example, weather conditions, radar data, neighboring air traffic, and the like, as will be appreciated in the art. Although FIG. 4 depicts a top view (e.g., from above the aircraft 402) of the navigational map 400 (alternatively referred to as a lateral map or lateral view), in practice, alternative embodiments may utilize various perspective views, such as side views, three-dimensional views (e.g., a three-dimensional synthetic vision display), angular or skewed views, and the like. The displayed area of the navigational map 400 corresponds to the geographic area that is currently displayed in the navigational map 400, that is, the field of view about the center location of the navigational map 400. As used herein, the center location of the navigational map 400 comprises a reference location for the middle or geometric center of the navigational map 400 which corresponds to a geographic location.

In an exemplary embodiment, the navigational map 400 is associated with the movement of the aircraft 102, and the aircraft symbology 402 and/or background 404 refreshes or otherwise updates as the aircraft 102 travels, such that the graphical representation of the aircraft 402 is positioned over the terrain background 404 in a manner that accurately reflects the current (e.g., instantaneous or substantially real-time) real-world positioning of the aircraft 102 relative to the earth. In some embodiments, the aircraft symbology 402 is shown as traveling across the navigational map 400 (e.g., by updating the location of the aircraft symbology 402 with respect to the background 404), while in other embodiments, the aircraft symbology 402 may be located at a fixed position on the navigational map 400 (e.g., by updating the background 404 with respect to the aircraft graphic 402 such that the map 400 is maintained centered on and/or aligned with the aircraft graphic 402). Additionally, depending on the embodiment, the navigational map 400 may be oriented in a cardinal direction (e.g., oriented north-up so that moving upward on the map 400 corresponds to traveling northward), or alternatively, the orientation of the navigational map 400 may be track-up or heading-up (i.e., aligned such that the aircraft symbology 402 is always traveling in an upward direction and the background 404 adjusted accordingly).

In some embodiments, the map 400 may be centered on the aircraft 402 such that the center location of the navigational map 400 corresponds to the current location of the aircraft 402. In this regard, the center location of the navigational map 400 may be updated or refreshed such that it corresponds to the instantaneous location of the aircraft 102 as the aircraft travels, as will be appreciated in the art. In alternative embodiments, the center location of the navigational map 400 may correspond to a geographic location that is independent of the current location of the aircraft 102, for example, when a user manipulates a user input device 106 to scroll the displayed area of the navigational map or select a portion of the displayed area that does not include the aircraft symbology 402.

The illustrated navigational map 400 includes a graphical representation of the originally intended destination airport 406 according to the flight plan (and the original route thereto), a graphical representation of the diversion destination airport 408, and a diversion route 410 from the current position of the aircraft 102 to the diversion airport 408. The illustrated embodiment depicts a scenario where the current energy level of the aircraft 102 is such that the descent guidance display process 200 determines the aircraft 102 can proceed with a stable descent strategy that utilizes idle thrusts with a descent beginning from the current aircraft position (e.g., strategy 310). In such an embodiment, the processing system 108 and/or display system 110 graphically indicates the descent rate (800 feet per minute (fpm)) associated with the identified descent strategy along with providing graphical indication of the first flap extension point 412 along the diversion route 410 where the flap is extended from the clean position. Additionally, the processing system 108 and/or display system 110 graphically indicates the targeted (or expected) airspeed (220 knots) and altitude (5000 feet) at the flap extension point 412.

Figure 5:
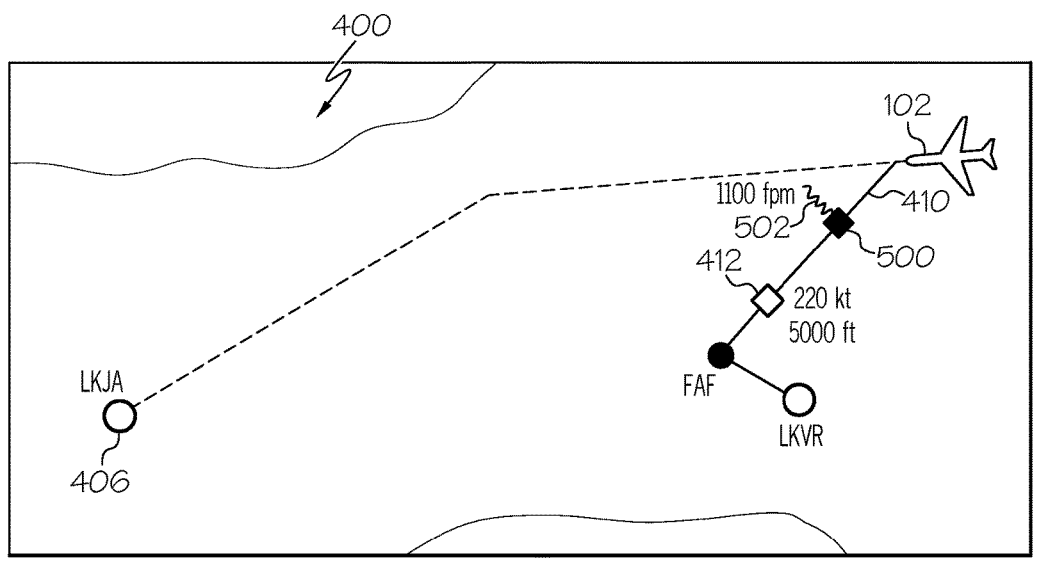

FIG. 5 depicts another embodiment of the navigational map 400 for a scenario where the current energy level of the aircraft 102 is such that the descent guidance display process 200 determines the aircraft 102 should decelerate on idle thrust at the current flight level before descending with idle thrust (e.g., strategy 320). In such an embodiment, the processing system 108 and/or display system 110 graphically indicates a transition point 500 (e.g., point 326) where the aircraft 102 should begin descending at a calculated distance along the route 410 from the current aircraft position that corresponds to the calculated distance for the level deceleration segment (e.g., segment 322) along with additional symbology 502 that indicates that point 500 is where the aircraft 102 should begin descending. The processing system 108 and/or display system 110 also graphically indicates the descent rate (1100 fpm) associated with the descent segment from the transition point 500 to the flap extension point 412 (e.g., segment 324).

Figure 6:
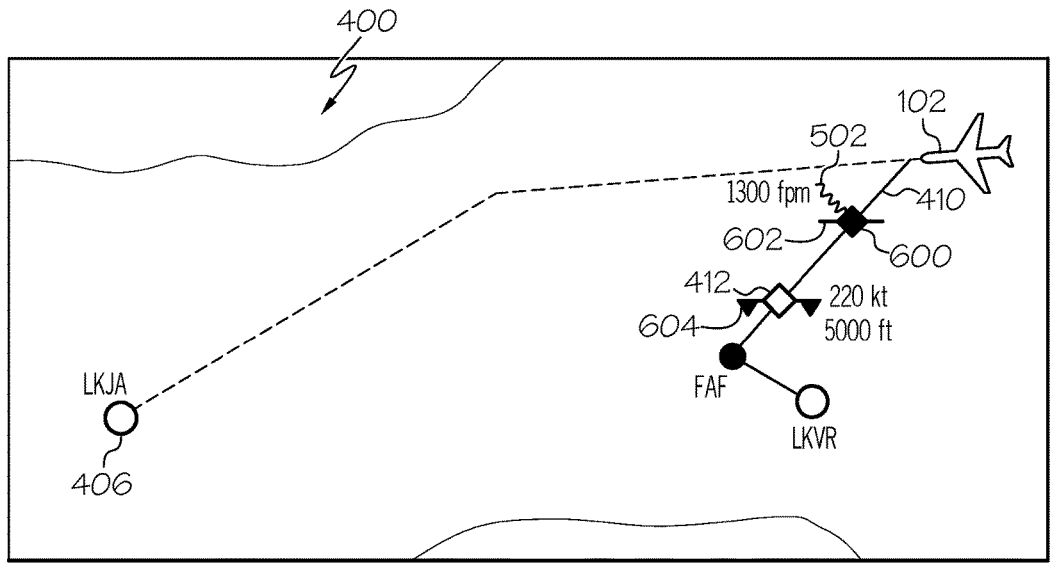

FIG. 6 depicts another embodiment of the navigational map 400 for a scenario where the current energy level of the aircraft 102 is such that the descent guidance display process 200 determines the aircraft 102 should decelerate on idle thrust at the current flight level before descending with speedbrakes (e.g., strategy 330) or another aircraft configuration to reduce the energy level. In such an embodiment, the processing system 108 and/or display system 110 graphically indicates a transition point 600 (e.g., point 336) where the aircraft 102 should begin descending at a calculated distance along the route 410 from the current aircraft position that corresponds to the calculated distance for the level deceleration segment (e.g., segment 332) along with additional symbology 502 that indicates that point 600 is where the aircraft 102 should begin descending. In the embodiment of FIG. 6, the transition point 600 is rendered with additional and/or different symbology 602 relative to transition point 500 to indicate a different aircraft configuration for the following descent segment. In addition or in alternative to rendering ornamental symbology, in some embodiments, different aircraft configurations may be indicated by rendering a transition point using one more of the following visually distinguishable characteristics, individually or in any combination thereof: different colors, different hues, different tints, different levels of transparency, translucency, opacity, contrast, brightness, or the like, different shading, texturing, fill patterns, and/or other graphical effects. For example, point 600 may be rendered with a vertical line or a different fill color or pattern than points 412, 500 to indicate it as a point of speedbrake application as compared to points 412, 500, which indicate proceeding with a current or idle thrust level. The processing system 108 and/or display system 110 also graphically indicates the descent rate (1300 fpm) associated with the descent segment from the transition point 600 to the flap extension point 412 (e.g., segment 334). Additionally, the illustrated embodiment of FIG. 6 depicts a scenario where the energy depletion of the in-line descent requires increased drag upon reaching the approach initialization point 412, and accordingly, additional ornamental symbology 604 is presented in graphical association with the approach initialization point 412 to indicate an increased drag configuration upon reaching the approach initialization point 412 in conjunction with initiating flap extension.

Figure 7:
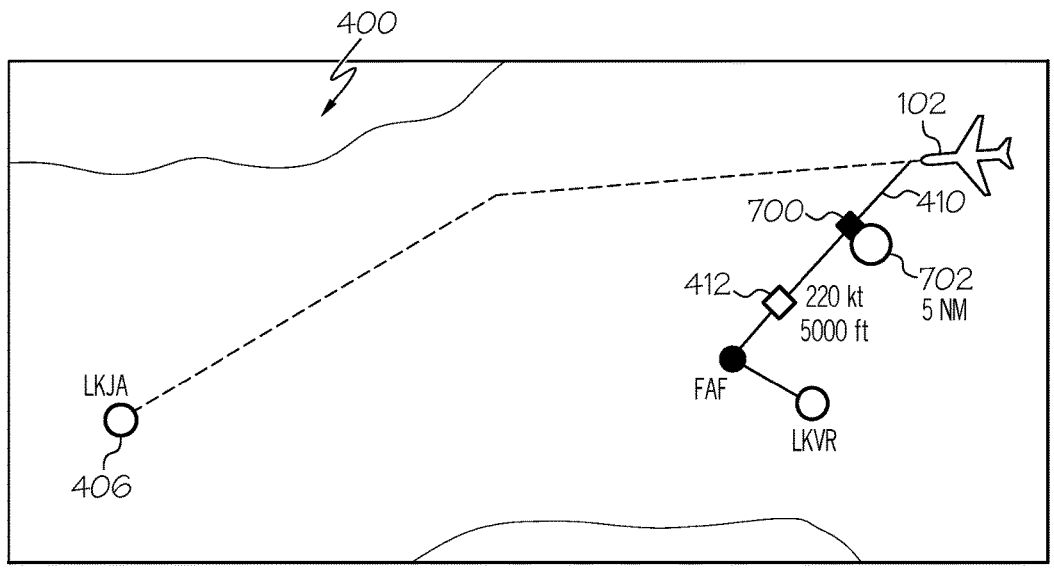

FIG. 7 depicts another embodiment of the navigational map 400 for a scenario where the current energy level of the aircraft 102 is such that the descent guidance display process 200 determines the aircraft 102 should perform a remedial action to reduce the current energy level before proceeding with a descent along the diversion route 410 (e.g., strategy 342). In such an embodiment, the processing system 108 and/or display system 110 graphically indicates a transition point 700 (e.g., point 344) where the aircraft 102 should begin the circling at a calculated distance along the route 410 from the current aircraft position that corresponds to the calculated distance for the level deceleration segment (e.g., segment 344). The processing system 108 and/or display system 110 graphically indicates a circling pattern 702 to be flown at the transition point 700 along with a graphical indication of a distance associated with the circling pattern 702 (5 nautical miles (nm)). The illustrated embodiment depicts the circling pattern 702 to reduce the energy level at the current flight level before returning to the transition point 700 with substantially the same altitude as the aircraft 102 has at point 600 in the embodiment of FIG. 6; however, in alternative embodiments, the circling pattern 702 may also include a descent (e.g., circling descent segment 346), in which case, the processing system 108 and/or display system 110 graphically indicates the descent rate associated with the circling pattern 702. In some embodiments, upon reaching the location corresponding to the transition point 700, the processing system 108 and/or display system 110 may dynamically update the navigational map 400 to include a graphical indication of the descent rate and aircraft configuration to be initiated after the circling pattern 702 has been executed. In other embodiments, upon the aircraft energy level being reduced during the circling pattern 702 that allows for a stable descent strategy to be constructed, the processing system 108 and/or display system 110 may dynamically update the navigational map 400 to include a graphical indication of the descent rate and aircraft configuration to be initiated from the current location of the aircraft. In this regard, during circling, one or more steps of the descent guidance display process 200 (e.g., tasks 208, 210, 212) may continually and/or periodically repeat while the aircraft is circling until a stable descent strategy can be determined.

Figure 8:
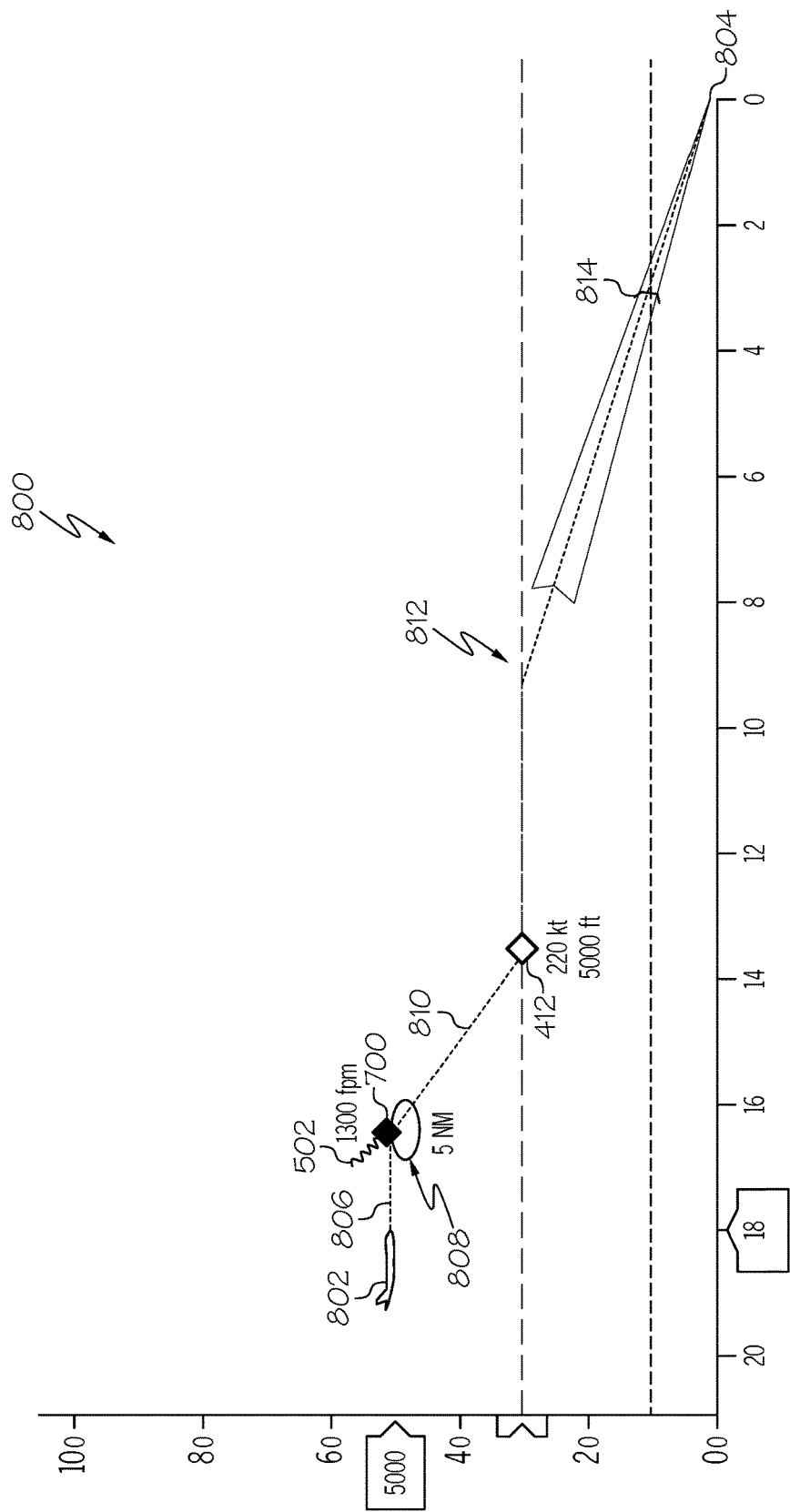
FIG. 8 depicts an exemplary vertical profile display suitable for display on a display device associated with the aircraft in the system of FIG. 1 in accordance with one or more embodiments of the exemplary descent guidance display process of FIG. 2, either independently of or in conjunction with the navigational map display depicted in FIG. 7.

FIG. 8 depicts a vertical profile display 800 (or vertical situation display) corresponding to the descent strategy depicted on the navigational map 400 in FIG. 7 for the portion of the diversion route 410 between the current aircraft location and the diversion airport 408. The vertical profile display 800 may be displayed on the display device 104 concurrently to the navigational map 400 in FIG. 7, for example, on different regions of the display device 104 bordering or otherwise adjacent to one another. The vertical profile display 800 includes a graphical representation 802 of the aircraft 102 at its current position relative to a location 804 of the diversion airport 408. The vertical profile display 800 also includes a graphical representation 806 of a deceleration segment at the current flight level for a calculated distance from the current aircraft position until reaching transition point 700 where a graphical indication 808 of the circling pattern 702 is provided. In a similar manner as described above, the distance associated with the circling pattern 806 is presented, and the transition point 700 is also associated with symbology 502 indicating the descent should begin upon re-reaching the transition point 700, along with additional indicia of the descent rate and aircraft configuration to be executed for the depicted descent segment 810 from the transition point 700 to the flap extension point 412. The vertical profile display 800 also includes a graphical representation 812 of the vertical profile of the stabilized approach from the flap extension point 412 to a graphical representation 814 of the decision point proximate the airport location 804.

FIG. 9 depicts a table of different symbologies and associated text that may be utilized to indicate different aspects of the descent strategy in one exemplary embodiment, and FIG. 10 depicts a table of different combinations of symbologies and associated text that may be utilized to convey information for different segments of different descent strategies. In this regard, a given combination of symbols on a navigational map may concurrently convey, to the pilot, the location and type of point (e.g., transition point versus approach initiation point) within the descent strategy, the airspeed targeted at that point, the aircraft configuration to be initiated at that point for the following navigational segment, the descent rate and/or airspeed to be targeted for that navigational segment, and the like. Thus, the pilot may be quickly apprised of the current situation and the manner in which the descent is to be executed.

Figure 11:
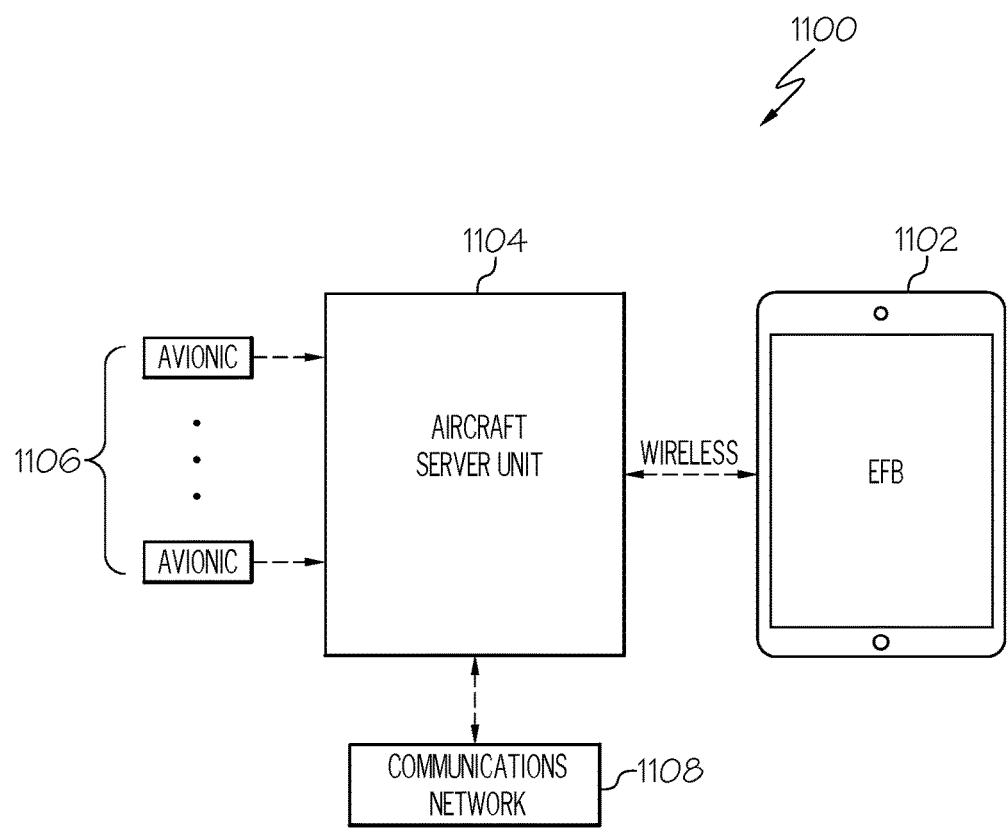
FIG. 11 depicts an exemplary embodiment of an electronic flight bag (EFB) system suitable for implementing the descent guidance display process of FIG. 2 in conjunction with the aircraft system of FIG. 1 in accordance with one or more embodiments.

FIG. 11 depicts an exemplary embodiment of an electronic flight bag (EFB) system 1100 suitable for implementing the subject matter described herein. The EFB system includes an electronic device 1102 (alternatively referred to as the EFB) that is communicatively coupled to a host device 1104 that is communicatively coupled to the avionics systems 1106 onboard an aircraft (e.g., avionics systems 112, 114, 116, 118, 120). The host device 1104 generally represents a computer system configured support the descent guidance display process 200 described herein and provide corresponding indications of the stable descent strategy on the electronic device 1102, and for purposes of explanation, but without limitation, the host device 1104 is referred to herein as a server unit (or server). In this regard, the host server 1104 includes at least a processing system (e.g., processing system 108) and/or other hardware computing resources along with one or more data storage elements (or memory) capable of storing instructions, that, when read and executed by the processing system, cause the host server 1104 to generate or otherwise support the descent guidance display process 200. The host server 1104 may also be coupled to a communications network 1108, which may be utilized to receive data and/or information (e.g., meteorological information, or the like) in conjunction with the descent guidance display process 200 and/or to support communications with the electronic device 1102.

In exemplary embodiments, the electronic device 1102 is realized as a laptop or notebook computer, a tablet computer, or another suitable computing device configured to provide EFB-functionality, and accordingly, the electronic device 1102 is alternatively referred to herein as an EFB. The EFB 1102 includes at least display device (e.g., display device 104) and a processing system (e.g., processing system 108 and/or display system 110), a data storage element (or memory) configured to support generating graphical representations of the diversion route or otherwise provide indications pertaining to the diversion route as described above. In this regard, the EFB 1102 may also generate or otherwise provide a navigational map (e.g., map 400) and/or a vertical profile display (e.g., vertical profile display 800) pertaining to the operation of the aircraft.

In one or more embodiments, a pilot of the aircraft utilizes the EFB 1102 to initiate the descent guidance display process 200 described above and input or otherwise provides the diversion airport the pilot would like to utilize. Thereafter, the EFB 1102 may transmit or otherwise provide indication of the desire to perform the descent guidance display process 200 to the server 1104 along with the identified diversion airport. The server 1104 accesses the avionics systems 1106 and/or the communications network 1108 to receive or otherwise obtain the current position of the aircraft, the current amount of fuel remaining onboard the aircraft, the meteorological information for the region of interest encompassing the diversion airport along with the current aircraft position, and the like. Thereafter, the server 1104 identifies a descent strategy and stabilized approach for a diversion route to the identified airport and provides indication of the diversion route and the corresponding stabilized descent and approach strategies to the EFB 1102, which, in turn, generates or otherwise provides a graphical indication of the diversion route and its associated descent and approach strategies on the display of the EFB 1102 (e.g., by highlighting or rendering the diversion route 410 overlying the terrain 404 of a navigational map 400 displayed by the EFB 1102 along with indications of the actions of the descent and/or approach strategies to be executed along the route 410). Thus, the pilot may utilize the EFB 1102 to assess or otherwise analyze the diversion route and operate the aircraft accordingly to descent towards the diversion airport in a stable manner.

By virtue of the subject matter described herein, the pilot or other vehicle operator can quickly ascertain how to operate a vehicle in the event of a diversion in a manner that allows for a stable approach to the diversion destination to be reliably executed. Particularly, in the case of an aircraft, the subject matter reduces the workload on the pilot and assists the pilot in operating the aircraft to ensure a stable descent to a stable approach to help ensure a safe landing upon reaching the diversion airport. At the same time, the descent strategies may be optimized to minimize the flight time, minimize fuel consumption, maximum passenger safety and/or comfort, and/or other factors as desired without laterally deviating from the route to the diversion airport. As a result, a pilot can focus on operating the aircraft en route to the diversion airport with improved situational awareness by reducing the need for the pilot to analyze the current scenario and determine a descent strategy that enables compliance with a stable approach. Current (or real-time) meteorological information as well as forecasted meteorological information, current (or real-time) configuration of the aircraft as well as predicted configurations of the aircraft, and other characteristics can also accounted for, thereby improving the performance of the descent strategy. Additionally, when a descent strategy aligned with the diversion route is not feasible given the current energy level of the aircraft, one or more remedial actions are determined and indicated to the pilot, thereby obviating the need for the pilot to determine whether or not a descent will be too steep, and if so, how the situation should be mitigated. By reducing pilot workload in an otherwise complex situation, the pilot's situational awareness with respect to current operations is improved, which, in turn, improves safety.

For the sake of brevity, conventional techniques related to graphics and image processing, avionics systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of assisting an aircraft for landing at an airport, the method comprising:
   determining a flap extension point for an approach to the airport based at least in part on a decision point proximate the airport and one or more stabilization criteria, the one or more stabilization criteria including at least one of a maximum airspeed limit and a maximum descent rate limit;
   determining one or more validation criteria associated with the flap extension point based on the one or more stabilization criteria, wherein the one or more validation criteria include at least one of a minimum airspeed at the flap extension point and a maximum airspeed at the flap extension point;
   obtaining, from a system onboard the aircraft, a current position of the aircraft and a current velocity of the aircraft;
   determining a descent strategy for the aircraft from the current position to the flap extension point based at least in part on the current position, the current velocity, and the one or more validation criteria associated with the flap extension point, wherein the descent strategy comprises one or more actions to decrease an energy level of the aircraft to satisfy the one or more validation criteria upon reaching the flap extension point; and
   providing graphical indication of the one or more actions of the descent strategy on a display device at respective points along a route from the current position to the airport.

2. The method of claim 1, the one or more validation criteria comprising airspeed limits for the flap extension point, wherein determining the descent strategy comprises determining the descent strategy resulting in a predicted airspeed for the aircraft at the flap extension point that satisfies the airspeed limits based at least in part on the current position and the current velocity.

3. The method of claim 1, wherein:
determining the descent strategy comprises determining a plurality of segments along the route to the airport, each segment of the plurality of segments having an associated descent rate and an associated aircraft configuration; and
providing the graphical indication comprises providing indicia of the associated descent rate and the associated aircraft configuration proximate a respective point on the route corresponding to the respective segment of the plurality of segments.

4. The method of claim 1, the one or more actions including an aircraft configuration for a portion of a route from the current position to the airport, wherein providing the graphical indication comprises displaying symbology indicative of the aircraft configuration proximate the portion of the route.

5. The method of claim 4, the descent strategy including a descent rate for the portion of the route, wherein providing the graphical indication comprises displaying the descent rate proximate the symbology.

6. The method of claim 1, further comprising:
obtaining meteorological information corresponding to the airport; and
obtaining a flight model for the aircraft, wherein determining the flap extension point comprises determining the flap extension point based on the meteorological information, the flight model, and the one or more stabilization criteria.

7. The method of claim 1, further comprising:
determining a circling pattern for the aircraft to reduce the energy level of the aircraft in conjunction with the descent strategy; and
providing additional indication of the circling pattern on the display device.

8. The method of claim 1, wherein determining the descent strategy comprises:
determining a plurality of potential descent strategies from the current position to the flap extension point based at least in part on the current position, the current velocity, and the one or more validation criteria associated with the flap extension point; and
identifying the descent strategy as a potential descent strategy having a minimum flight time among the plurality of potential descent strategies.

9. The method of claim 1, wherein determining the descent strategy comprises:
determining a plurality of potential descent strategies from the current position to the flap extension point based at least in part on the current position, the current velocity, and the one or more validation criteria associated with the flap extension point;
scoring each potential descent strategy of the plurality of potential descent strategies by weighting characteristics of the respective potential descent strategy with weighting factors assigned to the respective characteristics; and
identifying the descent strategy as an optimal descent strategy of the plurality of potential descent strategies based on the scoring.

10. A system comprising:
a display device having a map associated with an aircraft displayed thereon, the map including a graphical representation of the aircraft, a graphical representation of an airport, and a graphical representation of a route from a current position of the aircraft to the airport; and
a processing system coupled to the display device to:
determine a flap extension point for an approach to the airport based at least in part on a decision point proximate the airport and one or more stabilization criteria, the one or more stabilization criteria including at least one of a maximum airspeed limit and a maximum descent rate limit;
determine one or more validation criteria associated with the flap extension point based on the one or more stabilization criteria, the one or more validation criteria include at least one of a minimum airspeed at the flap extension point and a maximum airspeed at the flap extension point;
determine a current energy level associated with the aircraft;
determine a descent strategy for navigating the aircraft from the current position to the flap extension point for the approach to the airport based at least in part on the current energy level, the current position, and the one or more validation criteria associated with the flap extension point, wherein the descent strategy comprises one or more actions to decrease an energy level of the aircraft to satisfy the one or more validation criteria upon reaching the flap extension point; and
provide graphical indication of the one or more actions of the descent strategy on the map at respective points the route from the current position to the airport.

11. The system of claim 10, wherein:
the strategy comprises a plurality of segments along the route;
each segment of the plurality of segments has a travel rate and a configuration associated therewith; and
the indication comprises graphical indicia of the travel rate and the configuration for each segment of the plurality of segments at respective locations along the route corresponding to the respective segments.

12. The system of claim 11, wherein:
the travel rate comprises a descent rate.

13. The system of claim 10, further comprising a meteorological system coupled to the processing system to provide meteorological information corresponding to the airport, wherein the processing system determines the flap extension point based at least in part on the meteorological information and one or more stabilization criteria for the approach.

14. The system of claim 13, further comprising a data storage element maintaining a model of the aircraft, wherein the processing system is coupled to the data storage element to obtain the model and determine the flap extension point based on the meteorological information, the model, and the one or more stabilization criteria.

15. The system of claim 10, wherein the processing system determines a plurality of potential strategies from the current position to the flap extension point based at least in part on the current position, the current energy level, and the one or more validation criteria associated with the flap extension point and selects the descent strategy from among the plurality of potential strategies based on one or more selection criteria.

16. The method of claim 1, further comprising:
identifying the airport as a diversion destination for the aircraft;
obtaining, from a data storage element, a model quantifying characteristics of the aircraft; and
determining the approach to the diversion destination satisfying one or more stabilization criteria using the model, the approach comprising the flap extension point having one or more validation criteria associated therewith, wherein determining the descent strategy comprises determining the descent strategy for navigating the aircraft from the current position to the flap extension point based at least in part on the current position and the one or more validation criteria associated with the flap extension point, the descent strategy resulting in a predicted value for a characteristic of the aircraft satisfying the one or more validation criteria upon reaching the flap extension point.

17. The method of claim 1, further comprising displaying a graphical representation of the route on the display device, wherein:
providing graphical indication comprises providing graphical indicia of the one or more actions on the display device in association with the graphical representation of the route.

18. The method of claim 1, the one or more validation criteria comprising speed limits associated with the flap extension point, wherein determining the descent strategy comprises determining the descent strategy resulting in a predicted speed of the aircraft at the flap extension point that satisfies the speed limits based at least in part on the current position and the current velocity.

19. The method of claim 1, further comprising:
displaying a navigational map associated with the aircraft; and
displaying a graphical representation of the route from the current position of the aircraft to the airport on the navigational map, wherein providing the graphical indication comprises displaying symbology indicative of the one or more actions on the navigational map in association with the graphical representation of the route.

20. The method of claim 1, further comprising displaying a vertical profile display corresponding to the descent strategy for the route between the current position and the airport, wherein providing the graphical indication comprises displaying symbology indicative of the one or more actions on the vertical profile display.

* * * * *